United States Patent
Nagatomo et al.

(10) Patent No.: US 6,185,211 B1
(45) Date of Patent: Feb. 6, 2001

(54) ATM CELL EXCHANGE

(75) Inventors: Kenichi Nagatomo; Masami Hagio, both of Tokyo (JP)

(73) Assignee: Oki Electric Industry Co., Ltd., Tokyo (JP)

(*) Notice: Under 35 U.S.C. 154(b), the term of this patent shall be extended for 0 days.

(21) Appl. No.: 08/991,189

(22) Filed: Dec. 16, 1997

(30) Foreign Application Priority Data

May 21, 1997 (JP) .................................................... 9-130970

(51) Int. Cl.[7] ........................... H04L 12/28; H04L 12/54; H04L 12/56
(52) U.S. Cl. ........................... 370/395; 370/418; 370/429
(58) Field of Search .................................... 370/414, 416, 370/418, 428, 389, 394, 395, 542, 429; 340/825.5, 825.8, 825.79

(56) References Cited

U.S. PATENT DOCUMENTS

| | | | |
|---|---|---|---|
| 5,157,654 | * 10/1992 | Cisneros | 370/60 |
| 5,367,520 | * 11/1994 | Cordell | 370/60 |
| 5,550,823 | * 8/1996 | Irie et al. | 370/60.1 |
| 5,856,977 | * 1/1999 | Yang et al. | 370/411 |

FOREIGN PATENT DOCUMENTS 6-253347  9/1994 (JP) .

OTHER PUBLICATIONS

Abstract: "A 160 Gbit/s ATM Switch Using Dynamic Link Speed Controlled Switch Architecture", Yukihiro Doi, et al.; Tokyo, Japan, Oct., 1993.
Abstract: "High–Speed ATM Switching Technologies"; Naoaki Yamanaka, et al.; 1996; pp. 839–845.

* cited by examiner

Primary Examiner—Alpus H. Hsu
Assistant Examiner—Duc Ho
(74) Attorney, Agent, or Firm—Venable; Robert J. Frank; Allen Wood

(57) ABSTRACT

To realize an ATM cell switch capable of reducing the transmission rate of cells to be transmitted, a output buffer-type ATM cell switch includes input units buffer unit, and output units, wherein the buffer units reduce the transmission rate of the cells. Furthermore, the ATM switch compares the destinations of the cells with destination set signals that are provided to address filter units in the buffer units, and controls the transfer of cells to the buffer memories in the buffer units, thereby efficiently reducing the transmission rate of cells.

16 Claims, 13 Drawing Sheets

ATM CELL EXCHANGE

BACKGROUND OF THE INVENTION

1. Field of the Invention

The present invention relates to an ATM (Asynchronous Transfer Mode) exchange which is provided with a function of exchanging ATM cells.

2. Description of the Prior Art

There has been widely used an ATM exchange that exchanges cells which are fixed-length packets. To exchange the cells, the ATM exchange requires a buffer memory for temporally storing them. Concerning the arrangement and number of the buffer memory, there have been proposed a variety of exchanging methods. Several exchanging methods have been discussed in the following references: (1) "Development of a high-speed ATM exchange system", NTT R&D Vol. 95 No. 10 p. 839–846; and (2) "Method of configuring 160 Gigabit/s ATM exchange with a switch changing a link-speed" SSE 93-69, IN 93-76, CS 93-92 (1993-10).

More definitely, this invention relates to an output buffer type ATM exchange. Hereinafter, the output buffer type ATM exchange will be discussed first. An explanation of an ATM exchange with multiple steps (e.g., an ATM exchange with three steps shown in FIG. 12), which has some drawbacks in contrast with the output buffer type ATM exchange, will follow in order to clarify advantages of the output buffer type ATM exchange, which will proceed focusing on the disadvantages of the ATM exchange with multiple steps.

To summarize the following discussion, the conventional output buffer type ATM exchange shown in FIG. 11($a$) has solved the disadvantages of the ATM exchange with multiple steps shown in FIG. 12, that is to say, cell collisions. In the conventional output buffer type ATM exchange in FIG. 11($a$), the cells on the common bus 1205 are required to run at extremely high speed, which gives some difficulties, such as limitation on selecting devices, in designing the output buffer type ATM exchange. Therefore, the output buffer type ATM exchange according to this invention removes such difficulties. To attain the object, the principal architecture of the output buffer type ATM exchange in accordance with this invention is as follows: as shown in FIG. 1, the cells output from "one" input unit are distributed or divided into "a plurality of" output units. Furthermore, the present invention employs parallel expansion, which increases the number of the lines on which the cells runs. The parallel expansion allows the cells to run at low speed.

Hereinbelow, a conventional output buffer type ATM exchange will be explained, as an example of exchanging methods with reference to FIG. 11, which shows n by n output buffer type ATM exchange (n denotes the number of input lines and output lines). As shown in FIG. 11($a$), each of the input cells 1200-1 to 1200-n are fed into the respective input cell processors 1200-1 to 1200-n via the input line 1201-1 to 1201-n. The input cell processors 1202-1 to 1202-n each make the input cells 1200-1 to 1200-n be in phase, and implement bit expansion thereon, thus outputting the cells which have experienced the bit expansion, to the cell multiplexer 1204 via the lines 1203-1 to 1203-n. The cell multiplexer 1204 performs time division multiplex on the cells, thereby delivering the cells which have undergone the time division multiplex, to the output buffers 1206-1 to 1206-n via the common bus 1205.

In FIG. 11($b$), each of the output buffers 1206-1 to 1206-n incorporates the destination reference unit 1209 and the buffer memory 1210. The destination reference unit 1209 identifies the cells on the common bus 1205, to write only the cells directed to the respective buffer memory 1210 therein, whereby each buffer memory 1210 stores the cells directed thereto with the other cells not stored therein.

With respect to the length of the cells, the ITU-T recommendation and the ATM forum defines 53 byte. In most ATM exchanges, at the head of the 53 byte cell is added one byte, which is destination information designating the destination of the output buffer, whereby the 54 byte cell is exchanged. In FIG. 11($a$), the length of the cells 1200-1 to 1200-n is 54 byte.

FIG. 11($c$) shows the format of the 53 byte cell 1300, which is defined in the ITU-T recommendation and the ATM forum, while showing the format of the 54 byte cell 1301, which has one added byte 1302. In case of the 54 byte cell, the output buffers 1206-1 to 1206-n are necessarily larger, as compared with those of the 53 byte cell 1300. In addition, since the throughput a cell unit is larger, memories for speed control of the cells are necessary.

Incidentally, spreading of multimedia communication requires a high speed and large scale ATM exchange. The capacity of current ATM exchanges ranges from 10 Gbps to 20 Gbps, whereas the necessary capacity of the future ATM exchanges is approximately 100 Gbps.

As one of the schemes of developing the large scale and high speed ATM exchange, there has been known a method of connecting a plurality of switches of 10–20 Gbps exchange capacity, as disclosed in the references (1) and (2). An ATM exchange with three steps is illustrated in FIG. 12. This ATM switch comprises the unit switches 1420 to 1450 at the first step, the unit switches 1421 to 1451 at the second step, and the unit switches 1422 to 1452 at the third step. Here, the unit switch 1420, for example, accommodates input lines 1400-1 to 1400-m. Similarly, the other unit switches 1430, 1440, and 1450 accommodate the input lines 1401-1 to 1401-m, 1402-1 to 1402-m, and 1403-1 to 1403-m, respectively. On the contrary, at the third step, for example, the unit switch 1422 accommodates the output lines 1404-1 to 1404-m. Similarly, the other unit switches 1432, 1442, and 1452 accommodate the output lines 1405-1 to 1405-m, 1406-1 to 1406-m, and 1407-1 to 1407-m, respectively. At the second step, the unit switch 1421 is connected to the unit switches 1420 and 1430 via the respective lines 1411 and 1412, while being connected to the unit switches 1422 and 1432 via the respective lines 1413 and 1414. The other unit switches 1431, 1441, and 1451 are connected likewise. The ATM exchange has some problems as follows.

(1) The throughput in a link, or between a unit switch and the following unit switch, must be fast. For example, assuming that the throughput of each input line is V, the throughput of each link is m×V. More specifically, provided that the throughput of each of the input lines is 155.52 Mbps, and the number thereof is eight, the throughput of the link is approximately 1.2 Gbps. This means that a unit switch must have increased throughput, or operating frequency, with an increase in the number of the input lines and throughput thereof. Accordingly, the unit switch must write such fast cells therein.

With respect to devices, in comparison with ECL (Emitter Coupled Logic) and TTL (Transistor transistor Logic), CMOS (Complementary Metal-Oxide-Semiconductor) generally favors large scale integration of the ATM switch, which is advantageous in manufacturing and cost. However, CMOS does not enable the integrated ATM switch to operate beyond 150 MHz, and also imposes several restrictions on circuit designing relevant to delay and layout.

Furthermore, concerning the memory, it is difficult to store large numbers of cells therein at extremely high speed, for example, 150 MHz. Also, the power consumption of the memory increases with an increase of the operating frequency thereof. Hence, it is difficult to employ ECL and TTL in large scale integration of the memory in lieu of the CMOS in terms of operating speed and power consumption.

(2) In order to reduce the throughput of the links, there have been proposed a method of making each link in parallel and another method of increasing the number of the links between the unit switches. These methods, however, may increase the amount of wiring among the unit switches. For example, providing that each unit switch is integrated in a LSI and the LSIs are mounted on a printed wiring board, many wirings among the LSIs may be troublesome. In addition, crosstalk among the wirings and delay of the cells deteriorate with further high operation speed of the links.

Increasing the number of the links allows the unit switches to select the links more freely, which appears to avoid the above collisions. This increases the number of the paths including a plurality of links (e.g., the paths 1408, 1409 and 1410) through which each cell can pass. However, the increase of the paths makes it difficult for each unit switch to judge which of the paths is selected. Furthermore, it is difficult to configure an algorithm for selecting an appropriate path with no cell collision, and if possible, this leads to increasing of the hardware.

(3) There may occur collisions of the cells at the output points of the unit switches of the second step and other following switches. More definitely, assuming that the cells through the input line 1400-1 arrive at the output line 1406-1 while the cells through the input line 1402-1 arrive at the output line 1406-1, the former cells advances along the path 1408 and the latter cells advances along the path 1409. If both cells are fed in the unit switches 1420 and 1440, those cells collide with each other at the output point 1415 of the unit switch 1431 or at the buffer memory therein. Similarly, the cells through the input line 1403-m advance along the path 1410, whereby another collision may arise at the output point 1416 of the unit switch 1442 or the buffer memory thereof. Therefore, cascading a plurality of unit switches requires avoiding such collisions of the cells, which burdens the hardware of the unit switches with a large algorithm for avoidance.

(4) In case of cascading of a plurality of unit switches, there is required a trigger signal from a following unit switch to a preceding unit switch, wherein the control signal instructs the preceding unit switch to output the cells therefrom. Consequently, this further increases the number of wirings between neighboring unit switches. For example, in case of transferring the cells between the unit switch 1420 and the unit switch 1421 via the link 1411, the control signal 1417 originated by the unit switch 1421 serves to request the unit switch 1420 to output the cells to the unit switch 1421.

On the contrary, to cascading a plurality of unit switches, a single switch, such as an output buffer type switch or a common buffer type switch, appear to be preferable. However, these single switches requires multiplexing the input cells. Accordingly, this necessitates high speed operation in transferring and writing.

SUMMARY OF THE INVENTION

It is therefore an object of the present invention to provide an ATM cell exchange capable of exchanging cells at high transmission rate and with few cells discarded.

According to one aspect of the present invention, there is provided an output buffer type ATM cell exchange comprising: an input unit distributing a plurality of incoming cells having destination information which denotes a destination for each cell; a buffer unit buffering the distributed cells; and a plurality of output units performing parallel reduction on the distributed cells.

According to another aspect of the present invention, there is provided a sub-buffer unit in a buffer unit of an output buffer type ATM exchange which buffers incoming cells having destination information for each cell, the sub-buffer unit comprising: a buffer memory temporarily storing the incoming cells; an address filter unit assigned a given destination information, including a plurality of parallel expansion circuits implementing an parallel expansion on the incoming cells, a cell multiplexer implementing a multiplex on the parallel-expanded cells, and a write controller allowing a cell of the parallel-expanded cells to be written into the buffer memory upon judging that the destination information of the cell is coincident with the given destination information; and a reduction circuit implementing a parallel reduction on a cell output from the buffer memory.

According to another aspect of the present invention, there is provided a method of exchanging a plurality of cells which have destination information and pass one of a plurality of buffer memories having given destination information in an output buffer type ATM exchange, the method comprising the steps of: comparing the destination information contained in a cell with the given destination information; and allowing the cell having the same destination information as the given destination of a buffer memory to be stored into the buffer memory.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENTS

Hereinafter, the preferred embodiments of the ATM switch according to the present invention will be now described with reference to the accompanying drawings.

First Embodiment

<Configuration>

Figure 1:
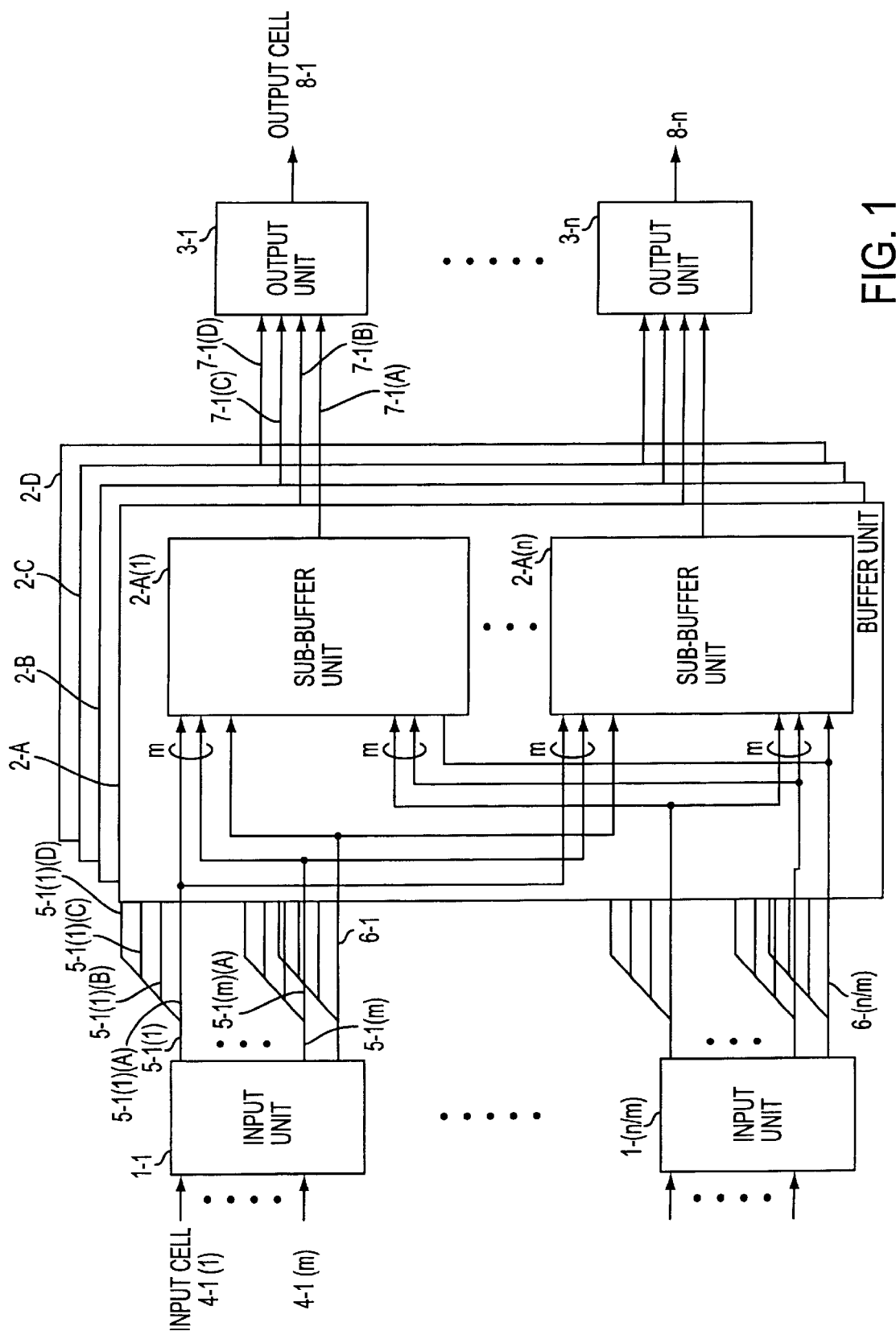
FIG. 1 is a schematic diagram showing the configuration of the first embodiment of the ATM cell switch according to the present invention.

FIG. 1 is a diagram showing the configuration of the first embodiment of the ATM switch, which is an output buffer type of n input lines by n output lines. As shown in FIG. 1, the ATM switch incorporates a plurality of input units 1-1 to 1-(n/m), a plurality of buffer units 2-A to 2-D, and a plurality of output units 3-1 to 3-n, where m denotes the number of input ports (usually called input "lines" hereafter for the sake of simplicity in describing the signal paths, although the term "line" as used herein should be understood as encompassing a bus for inputting cells) into each of the input units 1-1 to 1-(n/m). Assuming m=8 and n=64, the ATM switch requires 8 (=64/8) input units. Herein, all of the input units 1-1 to 1-(n/m) work similarly to each other, and all of the buffer units 2-A to 2-D work similarly to each other, and all of the output units 3-1 to 3-n work similarly to each other. The explanation will advance in order of the input units 1-1 to 1-(n/m), the buffer units 2-A to 2-D, and the output units 3-1 to 3-n.

<Input Unit>

First, the input cells 4-1(1) to 4-1(m) are fed to the input unit 1-1, and the other input cells are similarly fed to the other input units. Herein, for example, the input unit 1-1 executes parallel expansion, which is accomplished by dividing each of the input cells into a plurality of smaller cells (or cell portions) using a plurality of parallel signal lines, on the input cells 4-1(1), thus outputting expanded cells through the line 5-1(1) including four lines 5-1(1)(A) to 5-1(1)(D). Similarly, the other input units executes parallel expansion on the respective input cells. Furthermore, the input unit 1-1 multiplexes each first octet in each of the input cells 4-1(1) to 4-1(m) to output the multiplexed cells via the line 6-1.

<Buffer Unit>

Next, the main function of each of the four buffer units 2-A to 2-D is to buffer the cells which have undergone the parallel expansion in the input units 1-1 to 1-(n/m). For example, the buffer unit 2-A includes n sub-buffer units 2-A(1) to 2-A(n), wherein these n sub-buffer units 2-A(1) to 2-A(n) are used to receive n of the expanded cells. For example, the parallel-expanded cells via the line 5-1(A) are supplied to the n sub-buffer units 2-A(1) to 2-A(n). Similarly, expanded cells from the other input units are supplied to the n sub-buffer units 2-A(1) to 2A-(n).

As stated above, the expanded cells output from the input unit 1-1 to the buffer unit 2-A via the line 5-1(1)(A), are commonly distributed to the sub-buffer units 2-A(1) to 2-A(n). Similarly, the expanded cells via the line 5-1(1)(B), the cells via the line 5-1(1)(C), and the cells via the line 5-1(1)(D) are commonly distributed to the sub-buffer units (not shown) in the respective buffer units 2-B, 2-C, and 2-D. The expanded cells output from the other input units are distributed similarly to the cells output from the input unit 1-1.

The first octet data output on the line 6-1, which has been m multiplexed in the input unit 1-1, is input, for example, into each of the n sub-buffer units 2-A(1) to 2-A(n) in the buffer unit 2-A, and similarly is input in each of the sub-buffer units in the other buffer units 2-B to 2-D. Similarly, the first octet outputs on corresponding lines other than the line 6-1, which have been m multiplexed in the respective input units, are input in each of the n sub-buffer units in the buffer units 2-A to 2-D.

Incidentally, for example in the buffer unit 2-A, the sub-buffer unit 2-A(1) serves to exchange the expanded cells input through the m lines 5-1(1)(A) to 5-1(m)(A) based on the first octets input via the lines 6-1, wherein the exchanged cells are output to the output unit 3-1 via the line 7-1(A). The other sub-buffer units in the buffer unit 2-A work similarly, and further the sub-buffer units in the other buffer units 2-B to 2-D works similarly.

<Output Unit>

For example, the output unit 3-1 is fed with the exchanged cells from the buffer unit 2-A via the line 7-1(A), and is similarly fed with the other exchanged cells from the buffer units 2-B to 2-D via the lines 7-1(B) to 7-1(D), respectively, and the output unit 3-1 gathers those cells to output them via the line or port 8-1. More specifically, the output unit 3-1 generates new cells using the input cells to provide the new cells via the line 8-1. The other output units operate similarly.

<Operation>

Hereinbelow, the switching operation of the first embodiment of the ATM switch will be described in order of the input unit, the buffer unit, and the output unit. For easy understanding, in the following explanation, it is assumed m=8 and n=64. More definitely, the ATM switch is an output buffer type switch accommodating 64 input lines and 64 output lines, and having 2.5 Gbps transmission rate. Each input unit accommodates eight lines, which means that the number of the input units is also eight (=64/8). The number of the buffer units is four, wherein each buffer unit incorporates 64 sub-buffers, which means that there are totally 256 (=64*4) sub-buffers in the system. The number of the output units is 64 similarly to the number of the output lines. Finally, the format of the input cells and the output cells is identical with that of the cell 1301 in FIG. 11(c), where the destination information 1302 is added to the cells 1300 regulated in accordance with the ITU-T and the ATM forum.

<Input Unit>

Figure 2:
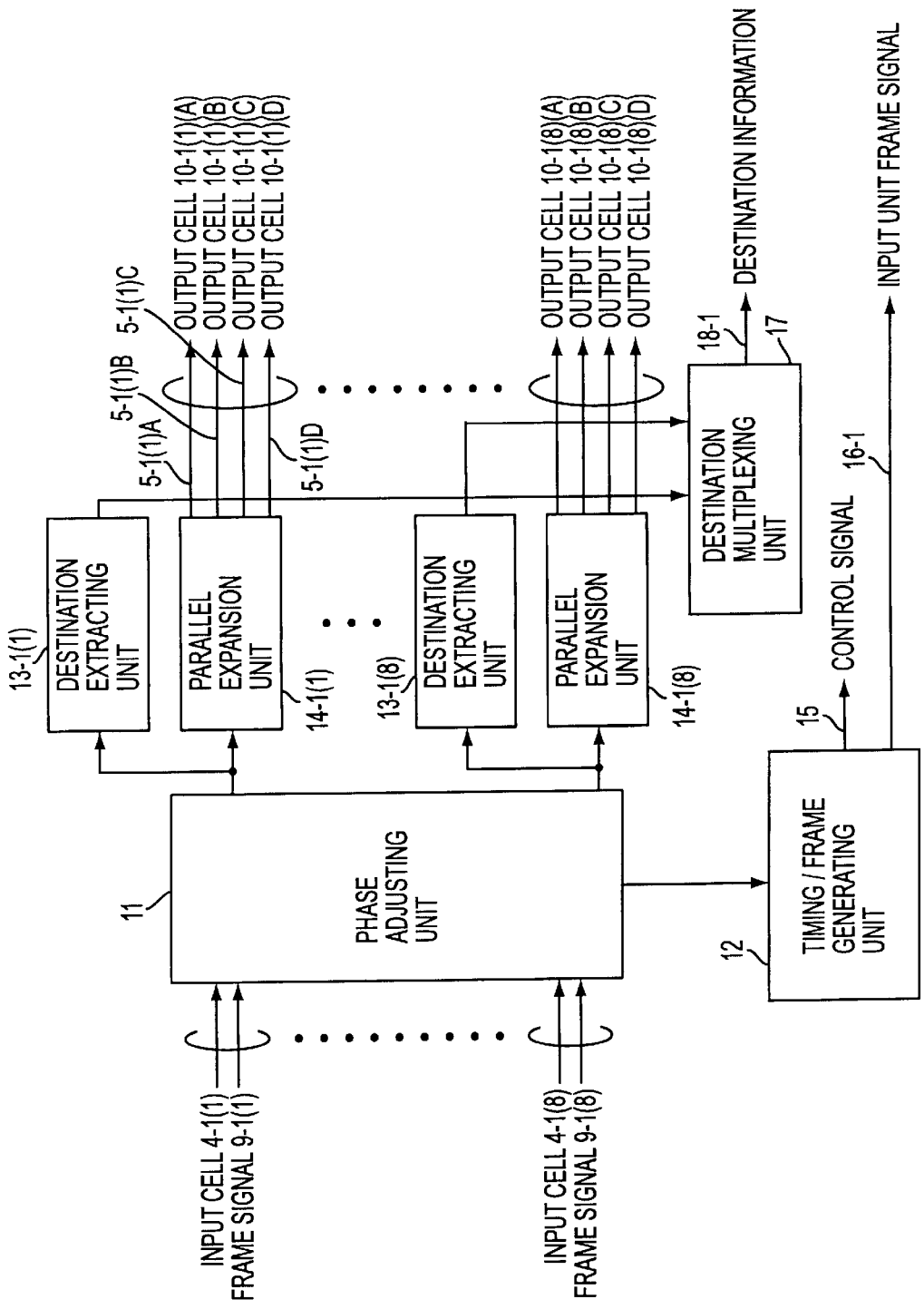
FIG. 2 is a schematic diagram showing the configuration of the input unit.
Figure 3:
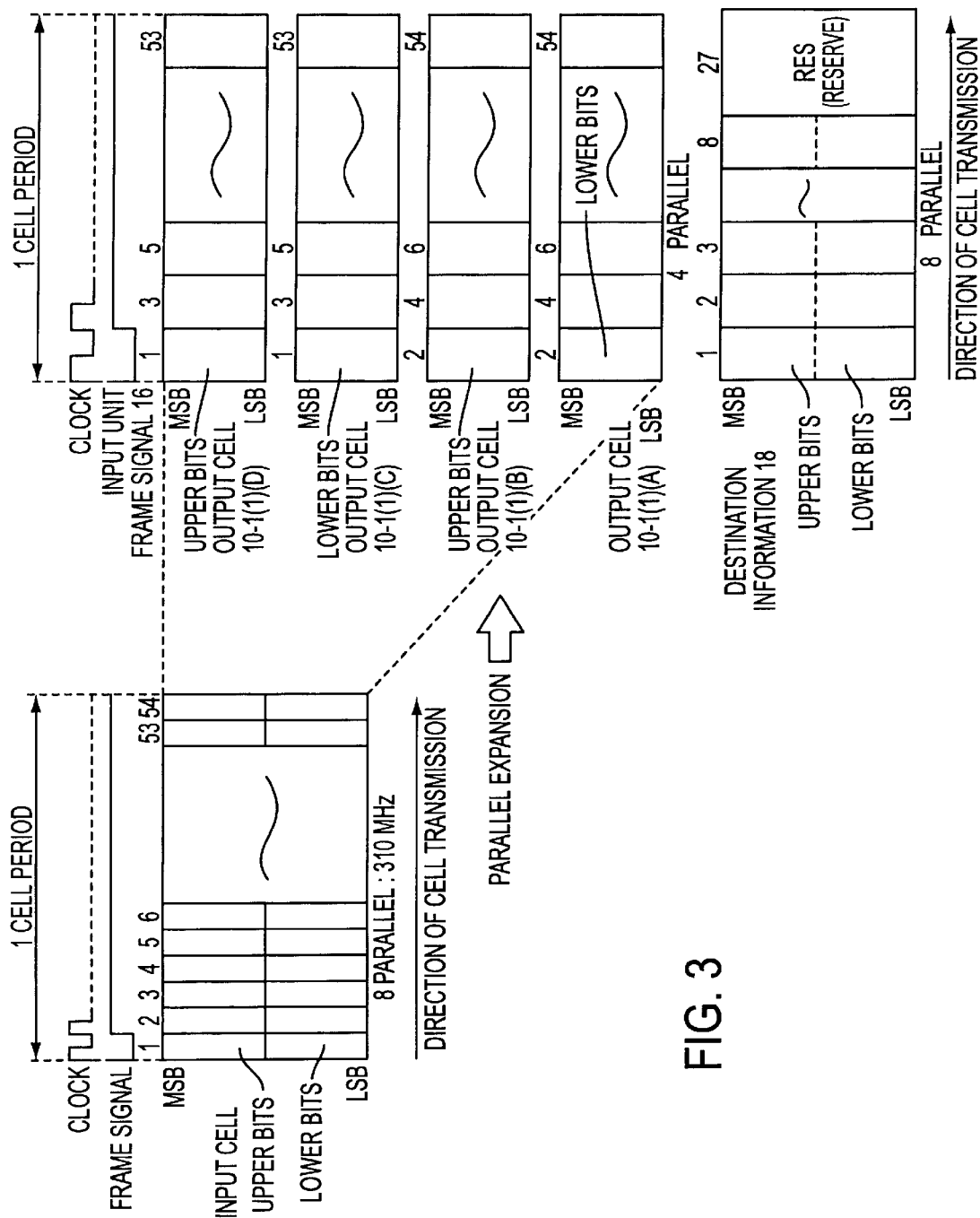
FIG. 3 is an explanatory diagram showing the operation of the input unit.

Hereinafter, the operation of an input unit will be described referring FIGS. 2 and 3 each illustrating the detailed configurations thereof. First, the input cells 4-1(1) to 4-1(8) and frame signals 9-1(1) to 9-1(8) are input to the phase adjusting unit 11. Here, the frame signal 9-1 is defined as a reference signal having fixed-length data for identifying the header of each cell. Each pair of an input cell and a frame signal is synchronizing, and more definitely, the input cell 4-1(1), the frame signal 9-1(1), and the clock used therefor are in phase as shown in FIG. 3. In addition, the input cells are fed in eight parallel (i.e., 8 bits at a time for each input cell); therefore, the operation frequency of the clock is approximately 310 MHz (=2.5 Gbps/8).

Figure 4:
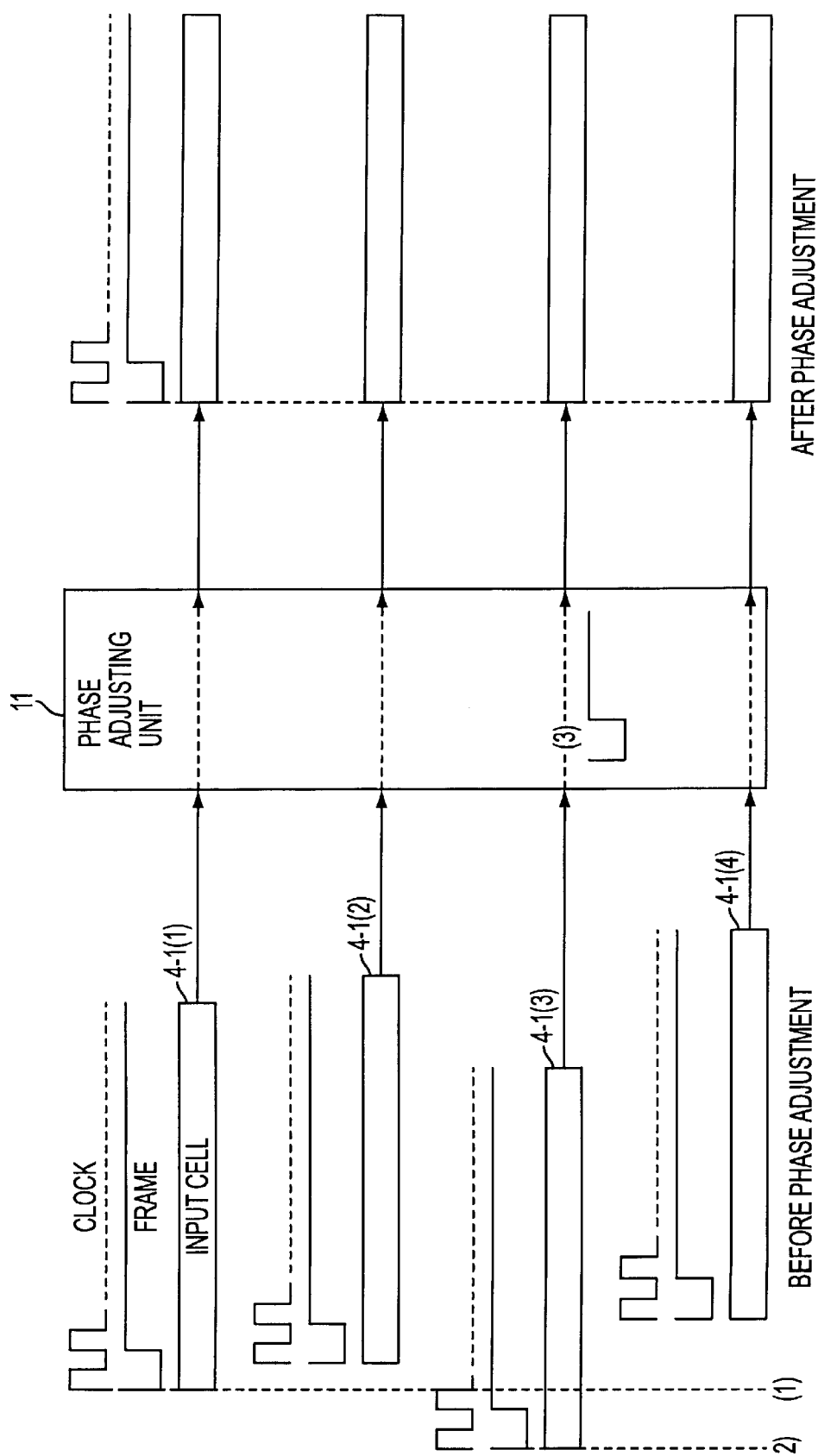
FIG. 4 is a diagram showing the operation of the phase adjusting unit in the input unit.

Incidentally, all of the input cells do not always synchronize with each other and all of the frame signals do not likewise. For example, the input cell 4-1(1) and the input cell 4-1(8) are not always in phase, and the frame signal 9-1(1) and the frame signal 9-1(8) are not always in phase. The reason is as follows: though those cells flow pursuant to the same clock, there arise some phase errors of the clock among the cells. Accordingly, the ATM switch needs to make all of the input cells be in synchronization with each other, using the built-in common clock. The phase adjusting unit 11 makes the input cells be in phase as shown in FIG. 4. Among the methods of adjusting the phases of the input cells are (1) adjusting based upon a given line (e.g., the smallest line number), (2) adjusting based upon the input line containing the earliest cell, and (3) adjusting based upon an independent clock prepared in the phase adjusting unit 11. Consequently, the synchronized input cells 4-1(1) to 4-1(8) and frame signals 9-1(1) to 4-1(8) are output to the destination extracting units 13-1(1) to 13-1(8), and a signal relevant to the phase adjustment is output to the timing/frame generating unit 12.

Responding to this signal, the timing/frame generating unit 12 generates the control signal 15 for use in internal circuits of the input unit 1-1 and the frame signal 16-1 used for identifying the headers of the cells output from the input unit 1-1 at the clock frequency 155 MHz.

The synchronized cells are also input to the parallel expansion units 14-1(1) to 14-1(8), wherein the parallel expansion circuits 14-1(1) to 14-1(8) execute parallel expansion on the input cells, thus allowing the input cells to convert from 8 parallel to 16 parallel, which indicates that the frequency of clock frequency halves from 310 MHz to 155 MHz. For example, in the parallel expansion circuit 14-1(1), an input cell is expanded into four parallel smaller cells (or four groups of cell information which was contained in the original cell) that are distributed to the buffer units 2-A to 2-D as the expanded output cells 10-1(1)(A) to 10-1(1)(D) via the lines 5-1(1)(A) to 5-1(1)(D). Here, the parallel expansion is implemented as shown in FIG. 3. More specifically, the octets 1 to 54 in the input cell are divided into the upper bits and the lower bits, and an expanded output cell 10-1(1)(A) (for example) involving the lower bits of the even numbered outlets is generated. Thereafter, the output cells 10-1(1)(A) to 10-1(1)(D) shown in FIG. 3 are respectively output to the buffer units 2-A to 2-D.

The destination extracting unit 13-1(1), for example, extracts the first octet of an input cell to output it to the destination multiplexing unit 17, and the destination multiplexing unit 17 multiplexes the first octets. The multiplexed first octets are ouput to the buffer unit 2-A as the destination information 18-1 with respect to the input unit 1-1, at the same clock frequency 155 MHz as that of the output cells 10-1(1)(A) to 10-1(1)(D). Besides, the destination information 18-1 is commonly output to the buffer units 2-B to 2-D. The first octets of input cells 4-1(1) to 4-1(8) are multiplexed in ascending order of line numbers to be the destination information 18-1 as shown in FIG. 3. Here, the system involving 8 lines requires 8 bytes in order to designate 8 addresses while the reserved bytes (RES) will be additionally available for an expanded system involving 16 lines. In addition, as shown in FIG. 3, the frame signal 16, the output cells 10-1(A) to 10-1(D), and the destination information 18-1 are synchronize with each other.

<Buffer Unit>

Figure 5:
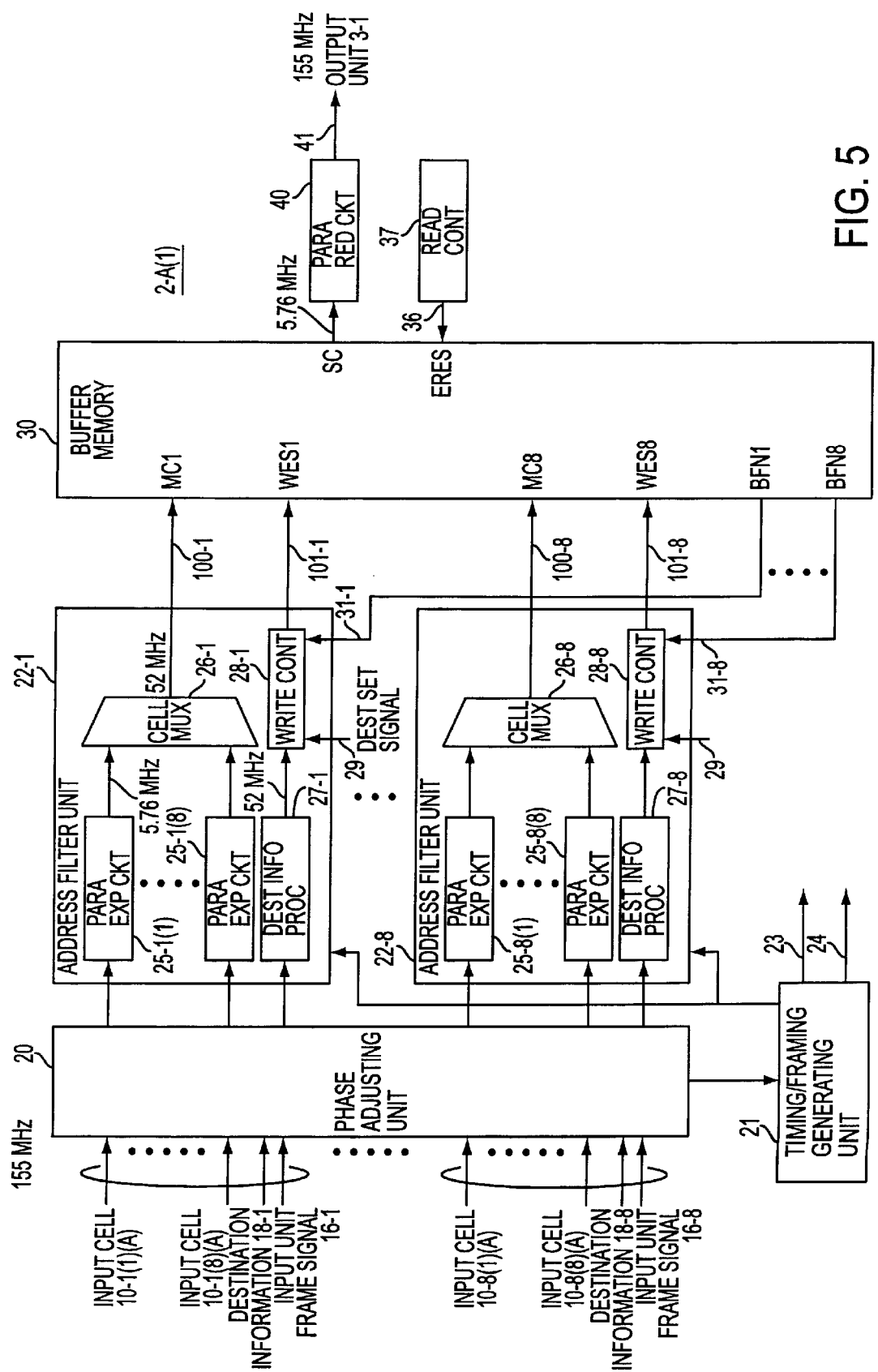
FIG. 5 is a diagram showing detailed configuration of the sub-buffer unit in the buffer unit.
Figure 6:
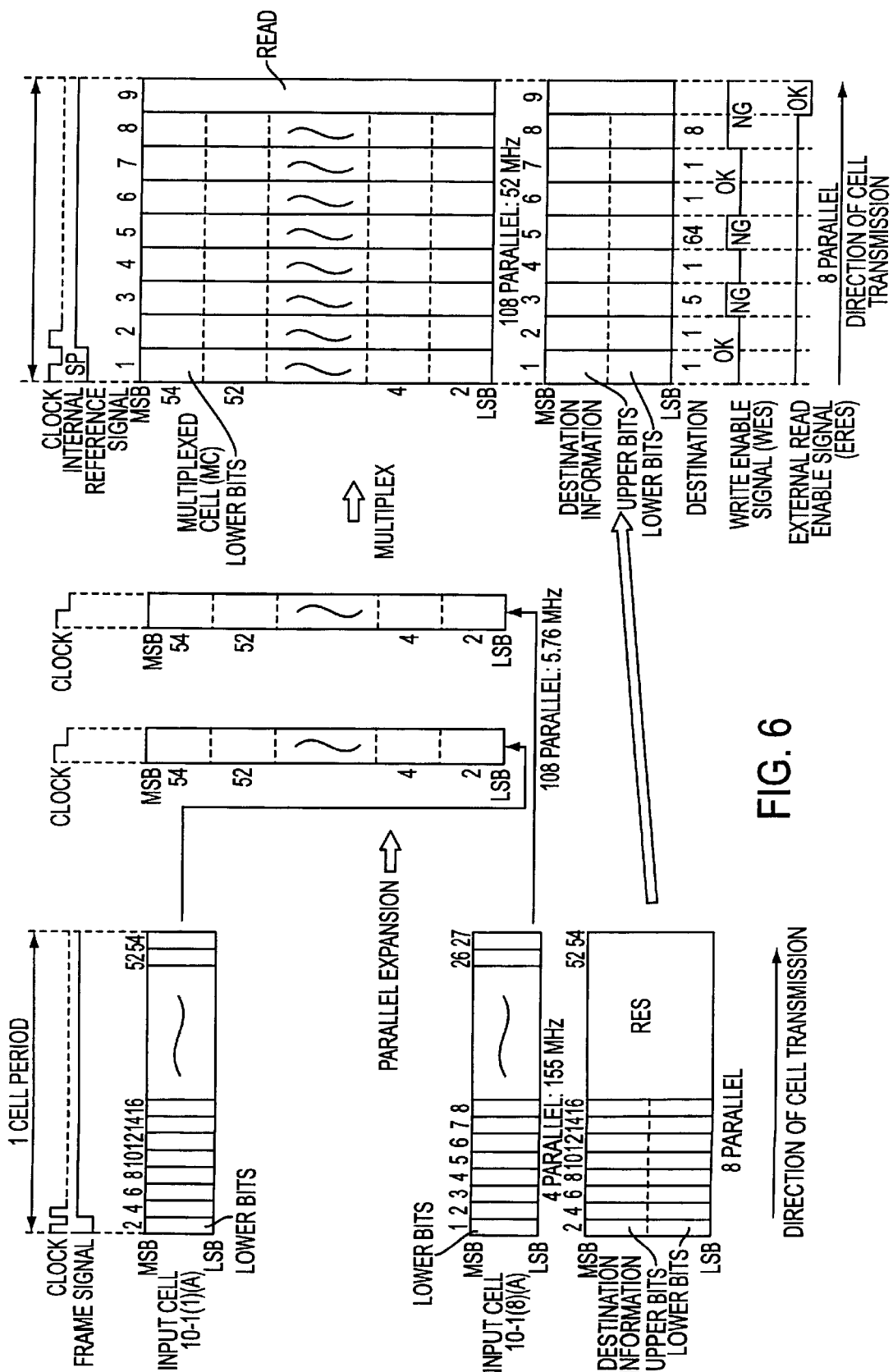
FIG. 6 is an explanatory diagram showing the operation of the sub-buffer unit.
Figure 7:
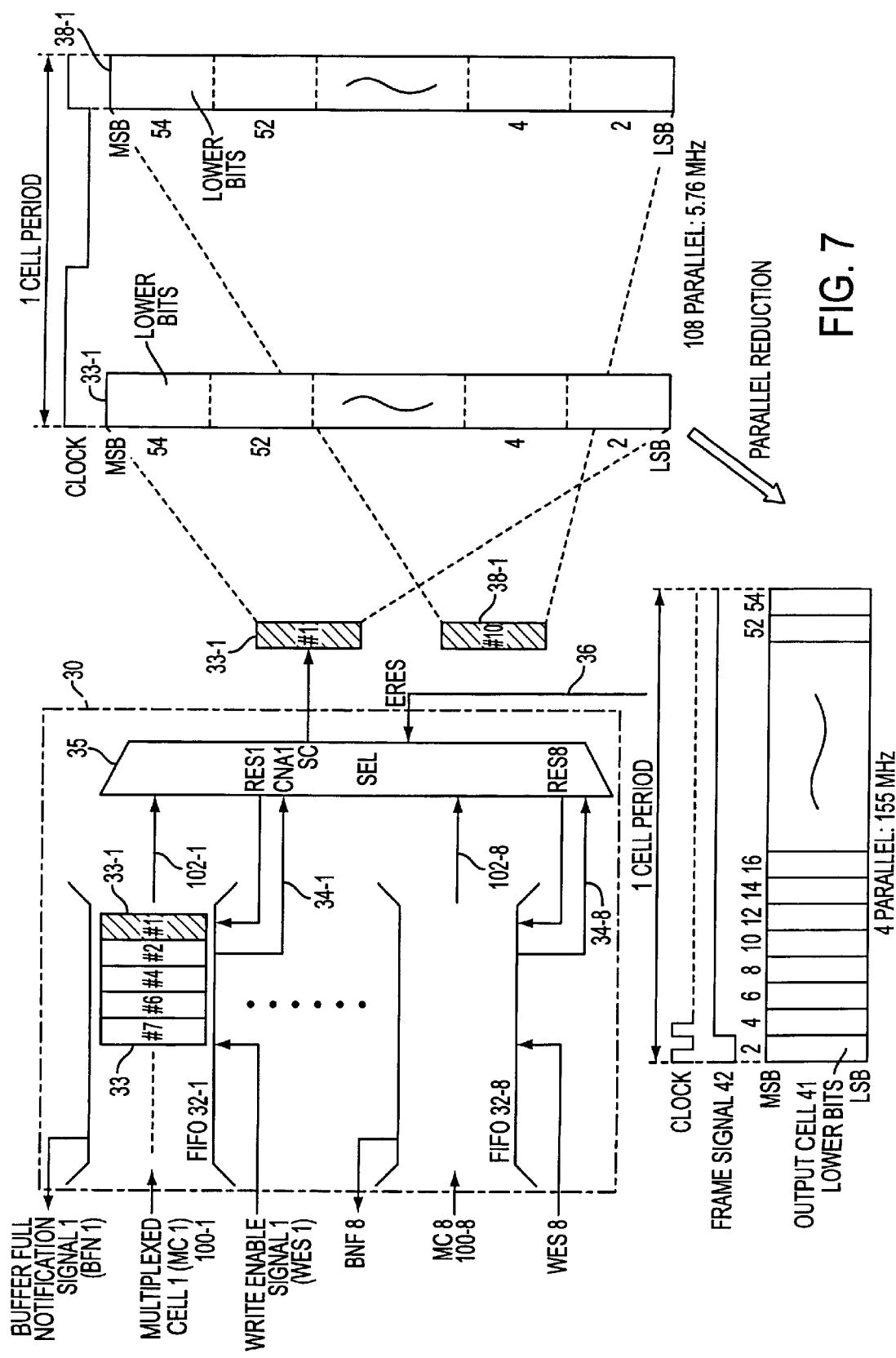
FIG. 7 is an explanatory diagram showing the operation of the FIFO in the buffer memory and the operation of the parallel expansion circuit.

FIG. 5 is a block diagram showing the detailed configuration of the sub-buffer unit 2-A(1) in the buffer unit 2-A, and FIGS. 6 and 7 are explanatory diagrams showing the operation of the sub-buffer unit 2-A(1). In FIG. 5, the expanded input cells 10-1(1)(A)~10-1(8)(A) to 10-8(1)(A) ~10-8(8)(A), the destination information 18-1 to 18-8, and the input unit frame signal 16-1 to 16-8 are fed to the phase adjusting unit 20, to adjust any phase errors of the clock among those signals. The phase adjusting unit 20 allows those signals to be in phase with each other, thereby outputting the synchronized cells and frame signals to the address filter units 22-1 to 22-8. Based upon the information denoting the synchronization of those signals in the phase adjusting unit 20, which is output therefrom, the timing/frame generating unit 21 generates the control signal 23 and the frame signal 24 of the sub-buffer unit 2-A(1). The frame signal 24 is used for identifying the header of the cells output from the sub-buffer unit 2-A(1).

The address filter units 22-1 to 22-8 are fed with the (A)-suffix expanded cells corresponding to the 64 lines and the destination information in synchronization, wherein for example, the address filter unit 22-1 is fed with the expanded cells corresponding to 8 lines. In the address filter unit 22-1, the cells enter the parallel expansion circuits 25-1(1) to 25-1(8) in 4 parallel (i.e., 4 bits at a time for each of the 8 expanded cells) in synchronization with the 155 MHz clock frequency, wherein the cells in 4 parallel undergoes parallel expansion in the parallel expansion circuit 25-1(1), for example, more definitely, the line number of the cells increases from 4 parallel to 108 parallel (108=4×(54 bytes÷2)). Consequently, operation frequency of the cells drops from 155 MHz to 5.76 MHz. A clock signal having 5.76 MHz is provided by the timing/frame generating unit 21. As shown in FIG. 6, the input cell 10-1(1)(A) in 4 parallel experiences parallel expansion in synchronization with the 5.76 MHz clock, thereby developing to 108 parallel at 52 MHz.

Subsequently, the cells in 108 parallel are fed into the cell multiplexer 26-1, wherein the cell multiplexer 26-1 implements 9 multiplex on the cells output from the parallel expansion circuits 25-1(1) to 25-1(8), and also synchronizes them with the 52 MHz clock frequency. This clock is generated by the timing/frame generating unit 21. Here, the reason why the 9 multiplexing is executed is to give a time for reading cells out of buffer memories, which will be described in detail later.

Hereinafter, the multiplexing in the cell multiplexer 26-1 will be described. In FIG. 6, an internal reference signal serves to identify the smallest line number of cells in the cell multiplexer 26-1, which is generated in the timing/frame generating unit 21. The multiplexed cells are the cells which have undergone parallel expansion in 108 parallel, wherein the cells are multiplexed in ascending order from the smallest number to the largest number. The area READ is an area that provides time for reading cells out of the buffer memory 30, wherein the area READ does not involve any cells.

Meanwhile, the destination information output from the phase adjusting unit 20, for example, is fed to the destination information processor 27-1 in the address filter unit 22-1. The destination information processor 27-1 makes the 155 MHz destination information synchronize with the 52 MHz clock. In short, the destination information output from the destination information processor 27-1 synchronizes with the 52 MHz clock and the position of the header of the destination information agrees with the starting position (SP) of the internal reference signal, which is required in writing cells into buffer memory 30. The write controller 28-1, for example, generates the write enable signal (WES) for memory writing. The write controller 28-1 needs to comprehend which of 64 output lines it should correspond to. To meet this requirement, to the write controller 28-1 is given the destination-set data or destination set signal 29 denoting which line it corresponds to. Furthermore, to all of the write controllers in a sub-buffer unit is given the common set signal. More definitely, the destination set signal 29 is shared by all of the write controllers 28-1 to 28-8 in the sub-buffer unit 2-A(1). In addition, the same destination set signal 29 is fed into the other sub-buffer units 2-B(1) to 2-D(1), wherein the functions of write controllers (not shown) therein are the same as that of the write controller 28-1 in the sub-buffer unit 2-A(1).

Figure 11A:
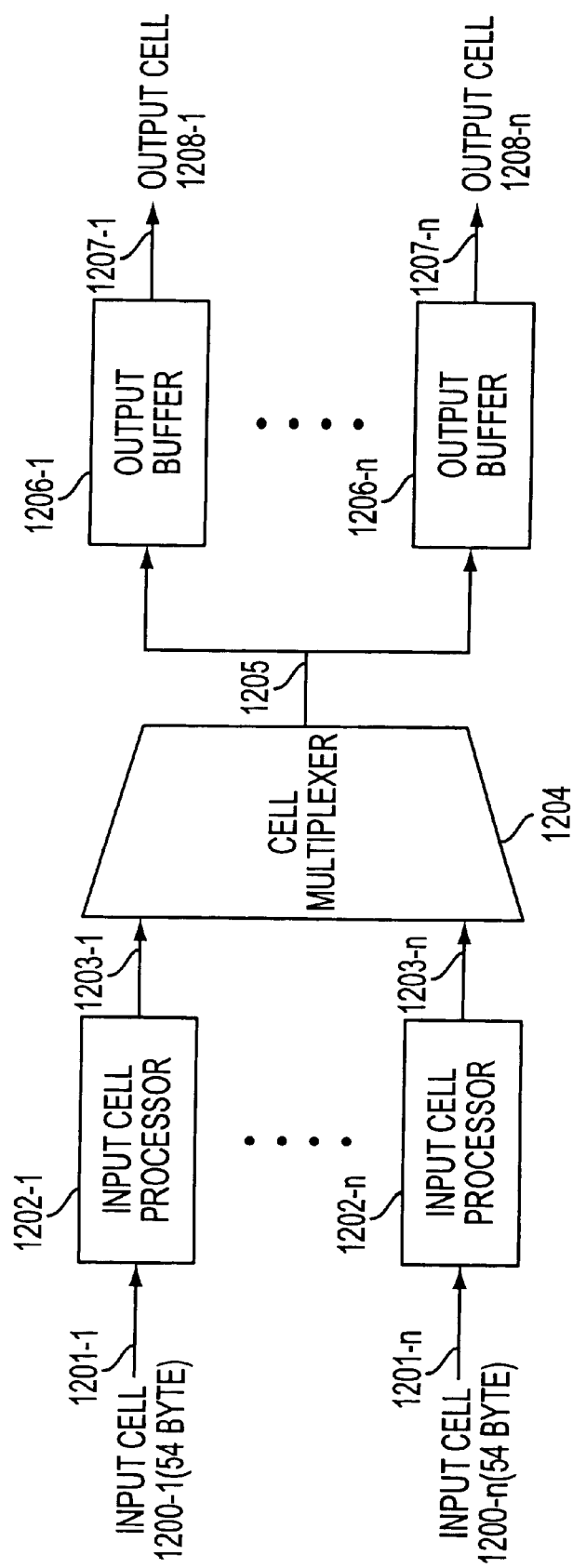
FIGS. 11(a) to (c) are diagram showing a conventional ATM switch.
Figure 11B:
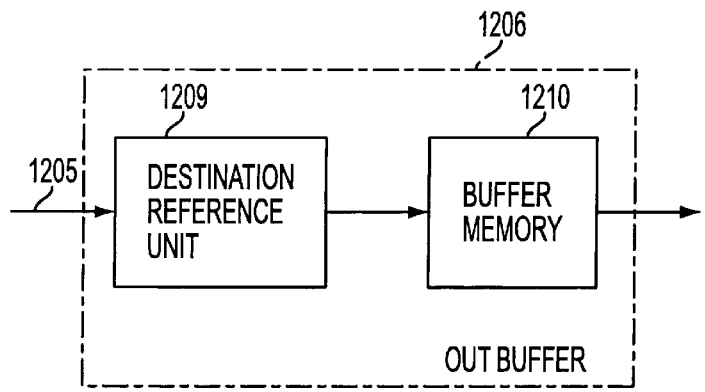
Figure 11C:
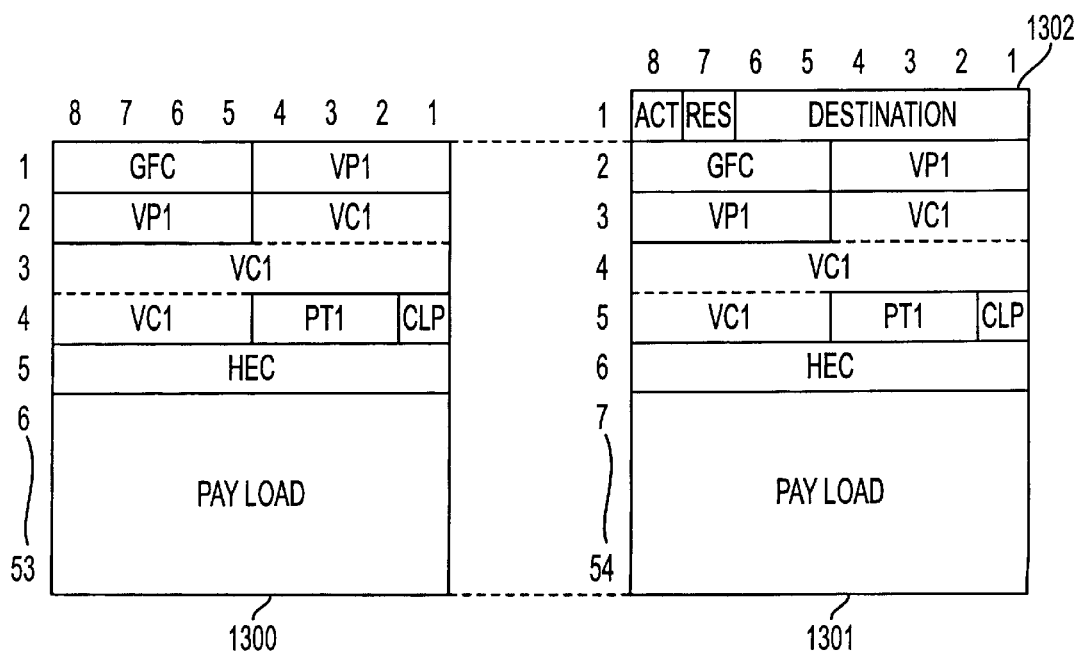
Figure 12:
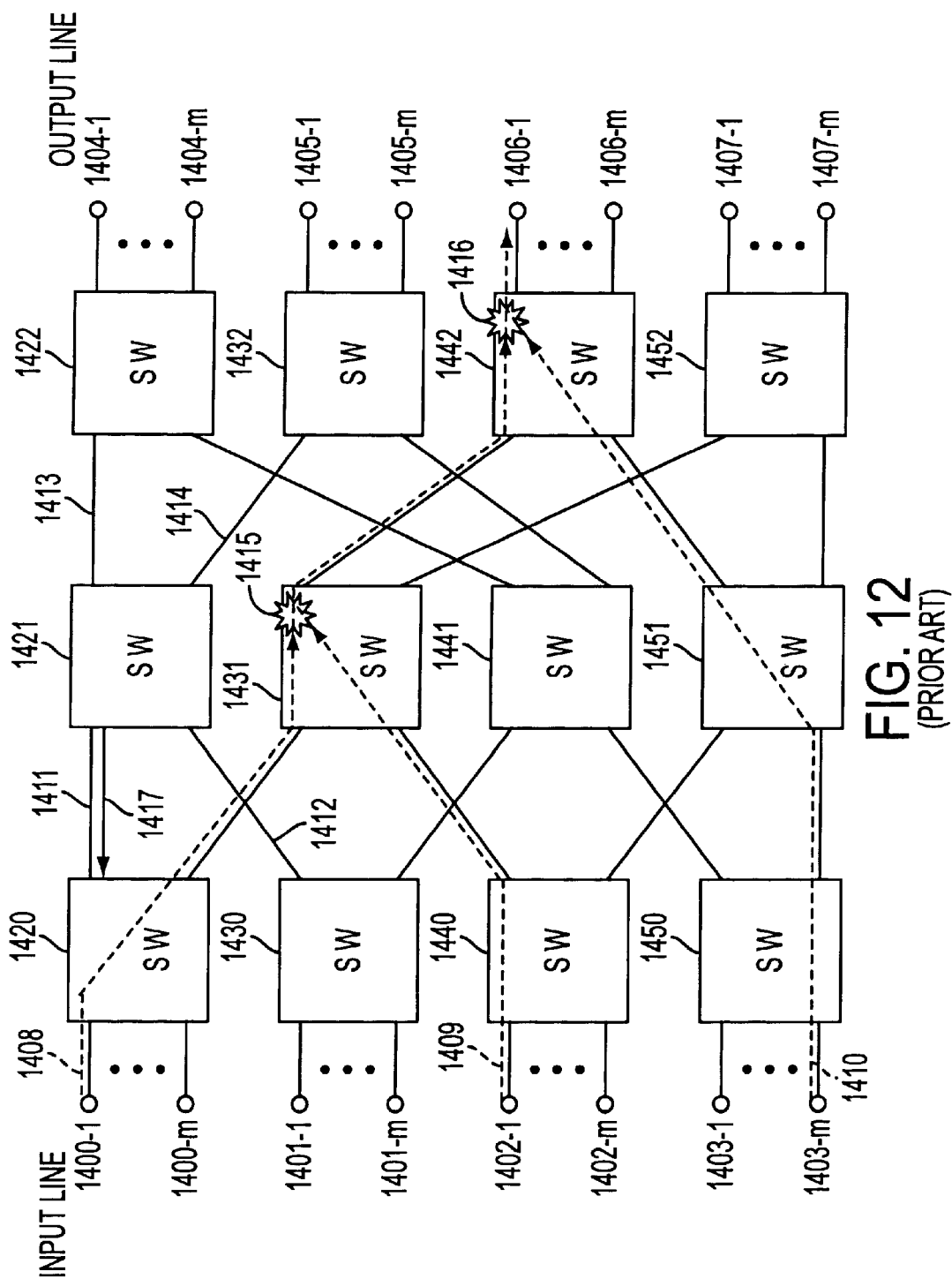
FIG. 12 is an explanatory diagram showing the operation of the conventional ATM switch.

Returning to the cell 1301 in FIG. 11(c), the data "destination" in the destination information byte 1302 denotes the number of the output line through which the cell 1301 should pass. The write controller 28-1 compares the destination specified in the cell output from the destination information processor 27-1, with the destination specified by the destination set signal 29. If identical, the write controller 28-1 validates the write enable signal (WES), whereby the expanded cell is permitted to advance to the buffer memory 30. Here, assuming that the destination set signal 29 denotes "1" but the destinations specified in the cells 1301 in FIG. 11(c) are "1", "1", "5", "1", "64", "1", "1", and "8", the respective cells are given "OK", "OK", "NG", "OK", "NG", "OK", "OK", and "NG" as the write enable signal (WES), whereby the expanded cells given "OK" are permitted to be written in the buffer memory 30 in the sub-buffer unit 2-A(1). More specifically, the 1st cell, the 2nd cell, the 4th cell, the 6th cell, and the 7th cell are permitted to be written therein.

On the contrary, the cell with the destination number "5" is written into the buffer memory for the 5th line (not shown), the cell with the destination number "64" is written into the buffer memory for the 64th line (not shown), and the cell with the destination number "8" is written into the buffer memory for the 8th line (not shown). Therefore, all of the expanded cells contained in the one cell period, are always written into one of the buffer memories. This indicates that all of the cells for the 64 lines input during the one cell period can be stored.

Besides, an external read enable signal (ERES) serves to read out data from the buffer memory. Herein, both of a dual port memory and a single port memory are basically available for the buffer memory, as long as the external read enable signal (ERES) is provided. There is, however, a difference therebetween. Employing a dual memory as the buffer memory does not require the external read enable signal (ERES) to be generated at a specific time, which allows the external read enable signal (ERES) to be positioned anywhere. In contrast to this, employing a single memory as the buffer memory requires the external read enable signal (ERES) to be generated at a specific time, more definitely, at a time differing from the time to which the write enable signals (WES) are assigned. Therefore, a ninth bit allocated to the time following the time for the write enable signals (WES) enables a single port memory to read out the data therefrom as well as a dual port memory.

The buffer memory 30 incorporates, for example, eight FIFOs 32-1 to 32-8 (First-in First-out) including eight write ports and one read port. The buffer memory 30 is fed with the expanded cells from the cell multiplexer 26-1. Also, the buffer memory 30 is fed with the write enable signal (WES) from the write controller 28-1, and the write controller 28-1 is provided with the buffer full notification signal (BFN) 31-1 notifying the address filter unit 22 that the buffer memory is full with cells. The buffer full notification signal (BFN) is output from the buffer memory 30. The buffer full notification signal (BFN) serves to inhibit the address filter units 22-1 to 22-8 from writing expanded cells beyond the storage capacity of the buffer memory 30. Therefore, for example, the write controller 28-1 does not allow the cells to be written in the buffer memory 30 upon receipt of a "NG" buffer full notification signal (BFN) 31-1, that is, it invalidates the write enable signal (WES1) 101-1. That indicates that overwriting the cells into the buffer memory 30 is inhibited while the cells are discarded upon inhibition of writing the cells.

Incidentally, as shown in FIG. 7, the accumulated cell 33 during one cell period is present in the FIFO 32-1. In this case, the cell nonaccumulation signal (CNA) 34-1, for example, denotes whether or not the cells are accumulated in the FIFO 32-1. The selector 35 serves for selection of the multiplexed cells output from the FIFOs 32-1 to 32-8, thus outputting the selected cells (SC). The external read enable signal (ERES) 36 is given by the read controller 37.

In the memory buffer 30 configured as described above, the multiplexed cells (MC) 100-1 to 100-8 are written according to the write enable signals (WES) 101-1 to 101-8. In accordance with the previous example, the 1st, 2nd, 4th, 6th, and 7th cells are permitted to be written into the buffer memory 30, namely, into the FIFO 32-1. The cells are written during one cell period.

In case of reading the cells, at first the selector 35 selects one among the multiplexed cells 102-1 to 102-8 output from the FIFO 32-1 to 32-8. Next, the selector 35 outputs the selected cells at the time that the external read enable signal (ERES) is "OK" as shown in FIG. 6. In order to permit the FIFO 32-1 corresponding to the 1st cell 33-1 of the selected cells 33 to output the cell 33-1, the selector 35 gives the FIFO 32-1 a "valid" read enable signal (RES1), wherein the 1st cell 33-1 is output in synchronization with the 5.76 MHz clock frequency. Assuming that the FIFO 32-2 (not shown) outputs the 1st cell 38-1 located at the top of the accumulated cells stored therein similarly to the 1st cell 33-1, the 1st cell 38-1 is output in synchronization with the 5.76 MHz clock frequency and further the time of period between the cell 33-1 and the cell 38-1 is one cell period. In this way, all of the cells stored in the FIFOs 32-1 to 32-8 are in turn output at intervals of one cell period. In this procedure, if storing no cell to be output, a FIFO is skipped. Whether or not the FIFOs 32-1 to 32-8 each store any cell to be output, is notifies to selector 35 using the cell non-accumulation signal 34-1 to 34-8.

In FIG. 5, the selected cell (SC) output from the buffer memory 30 is fed to the parallel reduction circuit 40. The parallel reduction circuit 40 executes on the input cell (SC) a parallel reduction, which is a function opposite to the parallel expansion, thus converting it from 108 parallel at 5.76 MHz to 4 parallel at 155 MHz, as shown in FIG. 7. Since the sub-buffer unit 2-A(1) handles processes related to the output line 1, the cells output from the parallel reduction circuit 40 in the sub-buffer unit 2-A(1) are directed to the output unit 3-1 that operates for the processes related to the output line 1, wherein transmission of the reduced output cells 41 starts at the header of the frame signal (low bit) as shown in FIG. 7.

<Output Unit>

Figure 8:
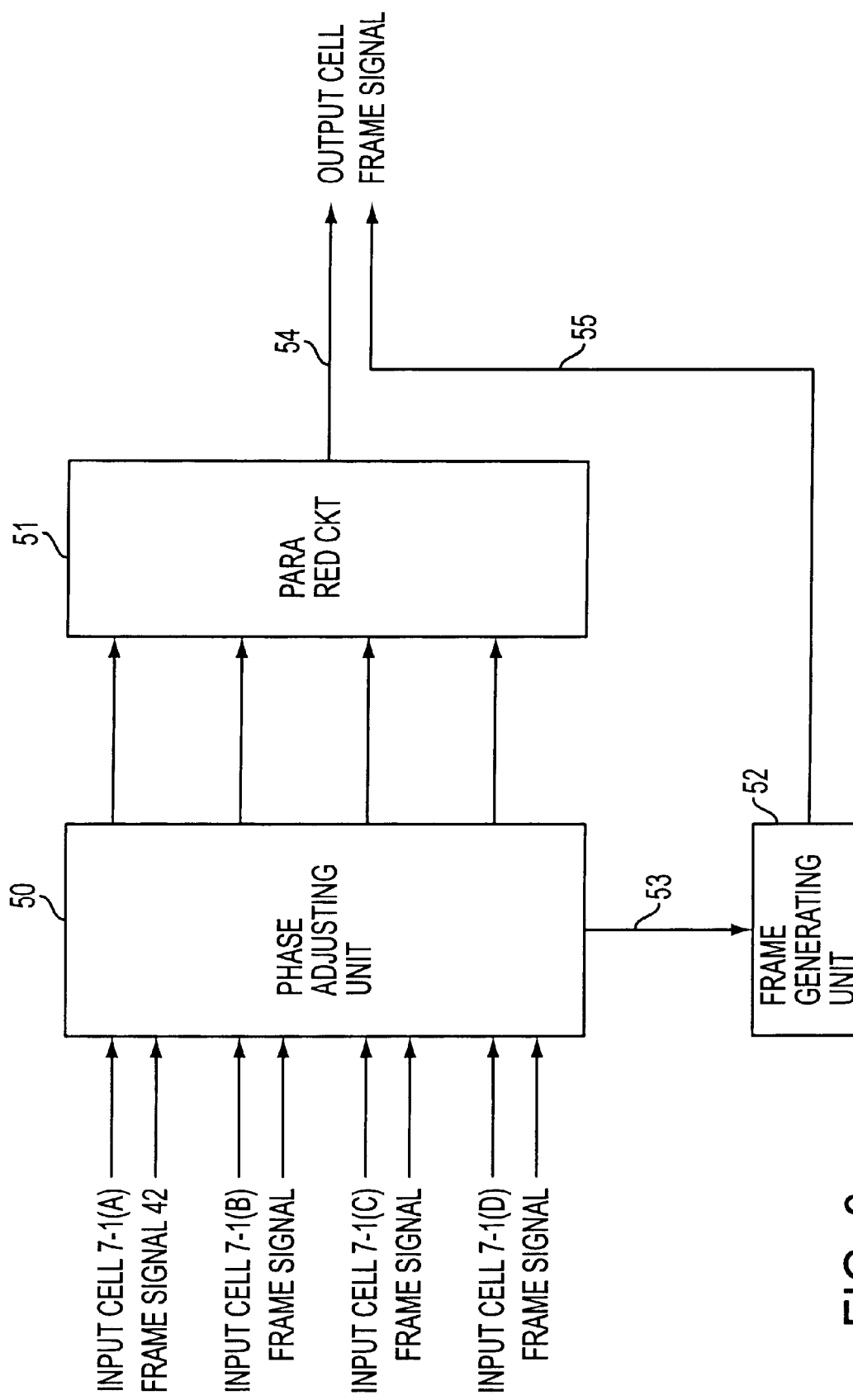
FIG. 8 is a schematic diagram showing the configuration of the output unit.
Figure 9:
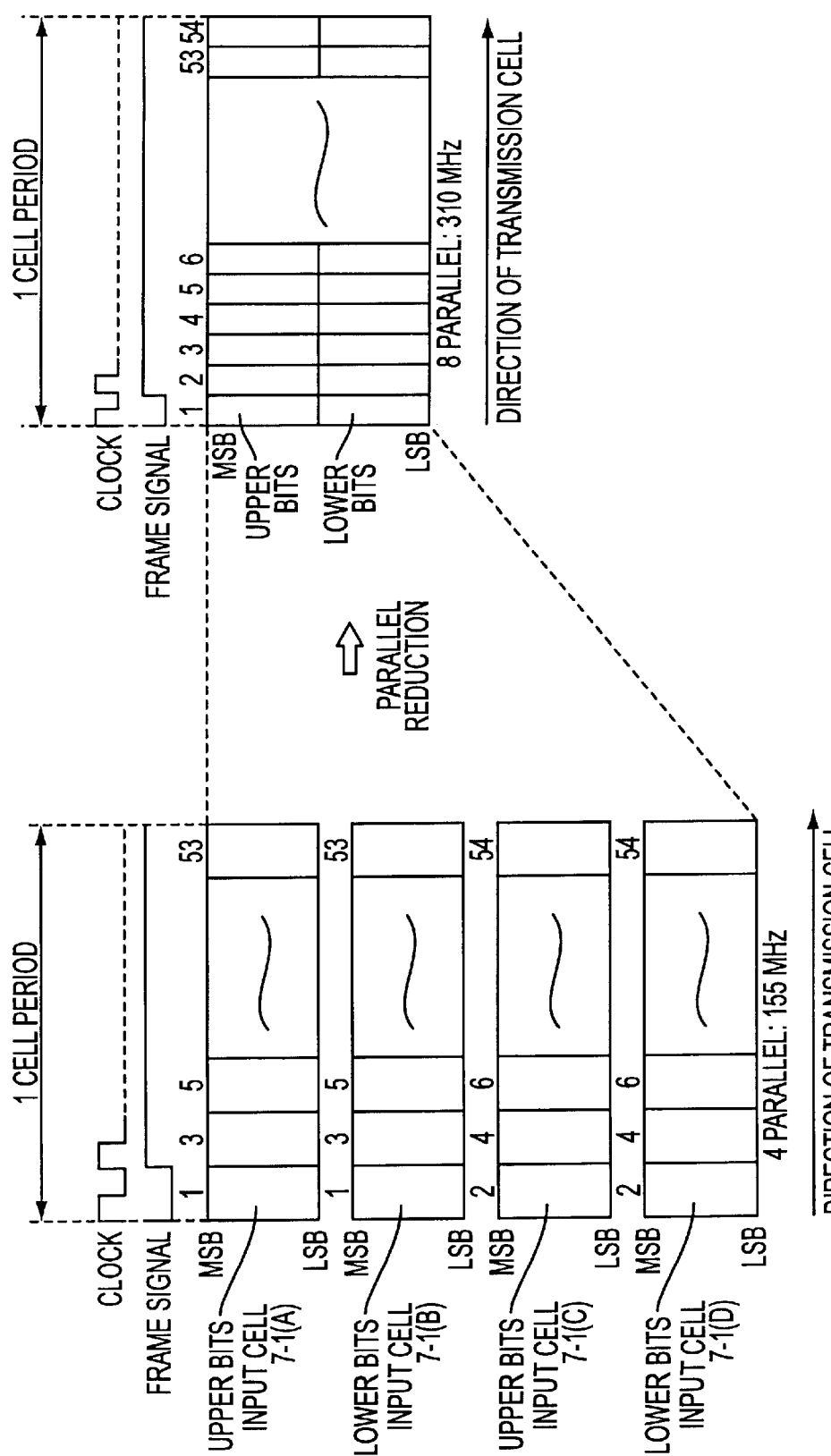
FIG. 9 is an explanatory diagram showing the operation of the output unit.

FIG. 8 shows the detailed configuration of the output unit 3-1. The output unit 3-1 comprises the phase adjusting unit 50, the parallel reduction circuit 51, and the frame generating unit 52. The phase adjusting unit 50 is, for example, fed with the input cell 7-1(A), which is the same as the output cell 41, and the frame signal 42 from the parallel reduction circuit 40 in the sub-buffer unit 2-A(1), while being fed with the other input cells and the corresponding frame signals likewise. Since the phases of the input cells may be slightly different from each other, the phase adjusting unit 50 permits the input cells to be in phase. Thereafter, the input cells are given to the parallel reduction circuit 51 while the notification signal 53 which denotes of the synchronization of the input cells, is given to the frame generating unit 52 from the phase adjusting unit 50. Responding to the notification signal 53, the frame generating unit 52 generates the frame signal 55. As shown in FIG. 9, the parallel reduction circuit 51 performs parallel reduction on the input cells 7-1(A) to 7-1(D), thus converting the cells from 16 parallel (4 parallel×4) at 155 MHz to 8 parallel at 310 MHz at the output cell 54. In this way, the input cells 4-1(1) to 4-1(m) which were split into four expanded cells in the input unit 1-1 are regenerated to the complete cells 8-1 in the output unit 3-1. In addition, the output cells 54 and the frame signal 53 are in phase.

As described above, the first embodiment of the ATM switch according to the present invention can reduce the speed of cells passing through the sub-buffer units of the buffer units by executing parallel expansion on input cells, thereby decreasing discarded cells. Furthermore, in a sub-buffer unit, the buffer memory notifies the corresponding address filter unit whether the corresponding FIFO is full of cells or not, and the address filter unit controls storing of cells in the FIFO based upon the notification. Accordingly, the ATM switch can more securely reduce the number of discarded cells because of avoiding overwriting cells. Also, an address filter unit checks destination information contained in cells that intend to pass through the address filter and to be stored in the corresponding FIFO. If the destination of the cell is different from that of the destination of the address filter unit, the address filter unit does not permit the cell to pass therethrough. In other words, the address filter unit allows only cells having the same destination as that thereof; the FIFO can avoid being filled with cells having the other destinations. This leads to reduction of discarded cells.

Second Embodiment

Figure 10:
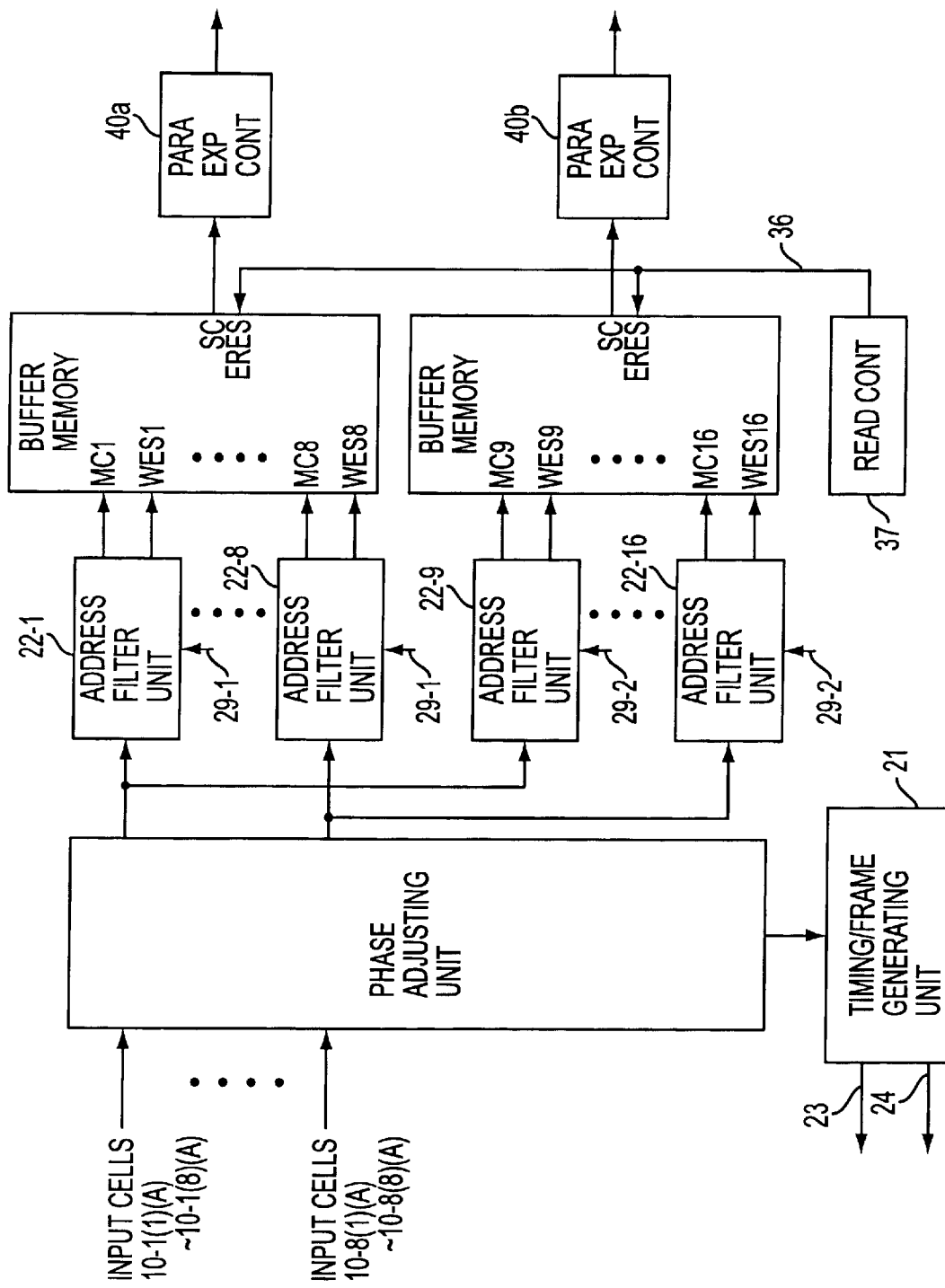
FIG. 10 is a schematic diagram showing the configuration of the sub-buffer unit in the second embodiment of the ATM switch.

Hereinafter, the second embodiment of the ATM switch according to the present invention will be described with reference to FIG. 10. In FIG. 5, assuming that a set is constituted of eight address filter units 22-1 to 22-8 and one buffer memory 30, the sub-buffer unit 2-A(1) in FIG. 10 includes two sets: one set is used for a first line, and the other set is used for a second line. This is the feature of the second embodiment in comparison with the first embodiment. The expanded cells for the first line are fed into the address filter units of the former set, while the expanded cells for the second line are fed into the address filter units of the latter set. The frame signal is shared by both of the sets. The other components and the expanded input cells are identical with those of the first embodiment.

Hereinbelow, the operation of the ATM switch of the second embodiment will be described. Since the address fitter units 22-1 to 22-8 work for the first line and the address filter units 22-9 to 22-16 work for the second line, the former address filter units 22-1 to 22-8 are given the number "1" denoting the first line through the destination set signal 29-1, whereas the latter address filter units 22-9 to 22-16 are given the number "2" denoting the second line through the destination set signal 29-2. Consequently, as compared with the first embodiment, where exchanging one line requires four sub-buffer units, the second embodiment realizes exchanging two lines using four sub-buffer units. Therefore, in case of 64 lines, the first embodiment requires 256 (64×4) sub-buffer units while the second embodiment requires the half, 128 sub-buffer units. Accordingly, provided that the whole architecture of one sub-buffer unit is packaged in one LSI, the second embodiment can reduce the number of LSIs (sub-buffer units), thus decreasing the amount of hardware and wiring therebetween and simplifying the configuration of the switch.

What is claimed is:

1. An output buffer type ATM cell exchange system, comprising:

an input arrangement for receiving cells via n input ports, each of the cells having destination information;

an output arrangement for emitting cells via n output ports in accordance with their destination information; and a buffer arrangement between the input arrangement and the output arrangement, the buffer arrangement including at least n sub-buffer units, wherein each sub-buffer unit includes a buffer memory unit and a plurality of address filters, each address filter receiving a plurality of groups of cell information, each group of cell information including information contained in a corresponding one of the cells that was received by the input arrangement, each address filter additionally receiving destination information derived from the corresponding cells for the groups of cell information, and each address filter additionally receiving destination-set data corresponding to one of the n output ports, and wherein each address filter includes a plurality of parallel expansion units for parallelly expanding the groups of cell information, a multiplexer for multiplexing the parallelly-expanded groups, and a write controller which allows a parallelly-expanded and multiplexed group of cell information whose destination information agrees with the destination-set data to be written into the buffer memory unit.

2. The ATM cell exchange system of claim 1, wherein the buffer memory unit comprises a plurality of memories, each corresponding to one of said address filters, and wherein the write controller allows a parallelly-expanded and multiplexed group of cell information whose destination information agrees with the destination-set data to be written into the memory corresponding to the respective address filter.

3. The ATM cell exchange system of claim 2, wherein the cells received at the input ports have a cell period, and wherein the buffer memory unit further comprises a selector which selects one of the memories for reading out of a parallelly-expanded and multiplexed group of cell information stored therein in response to a read enable signal which becomes effective once per cell period.

4. The ATM cell exchange system of claim 3, wherein the multiplexer multiplexes the parallelly-expanded groups of cell information at a rate such that the parallelly-expanded and multiplexed groups have a period corresponding to the cell period, and such that there also exists a time which is assigned to no group and during which the read enable signal becomes effective.

5. The ATM cell exchange system of claim 3, wherein each of the memories outputs a no-group signal to the selector when no parallelly-expanded and multiplexed group is stored in the corresponding memory, and wherein the selector does not select such a memory that outputs a no-group signal.

6. The ATM cell exchange system of claim 2, wherein each of the memories outputs a buffer full signal to the corresponding write controller when it becomes full, and wherein the corresponding write controller allows no more parallelly-expanded and multiplexed groups to be written into the corresponding memory even if the destination information of a parallelly-expanded and multiplexed group agrees with the destination-set data.

7. The ATM cell exchange system of claim 1, wherein the buffer memory unit outputs the parallelly-expanded and multiplexed groups, and wherein each of the n sub-buffer units further comprises a parallel reduction circuit for parallelly-reducing the parallelly-expanded and multiplexed groups outputted from the buffer memory unit.

8. The ATM cell exchange system of claim 1, wherein the input arrangement extracts the destination information of the cells received via the n input ports, multiplexes the extracted destination information to produce multiplexed signals, and outputs the multiplexed signals to the address filters, and wherein the write controller compares one of the multiplexed signals with the destination-set data to determine whether the destination information for a corresponding one of the parallelly-expanded and multiplexed groups agrees with the destination-set data.

9. The ATM cell exchange system of claim 1, wherein the input arrangement parallelly-expands the cells received via the n input ports to generate the groups of cell information before outputting the groups to the buffer arrangement.

10. The ATM cell exchange system of claim 1, wherein the buffer arrangement comprises a plurality of units, each having n sub-buffers.

11. The ATM cell exchange system of claim 1, wherein the destination-set data received by the address filters of a sub-buffer unit is common destination-set data that is received in common by all of the address filters of that sub-buffer unit.

12. An output buffer type ATM cell exchange system, comprising:

an input arrangement for receiving cells via n input ports, each of the cells having destination information, and for dividing each cell except for the destination information therein into a first number of groups of cell information;

an output arrangement for emitting cells via n output ports in accordance with their destination information; and a buffer arrangement between the input arrangement and the output arrangement, the buffer arrangement having a second number of buffer units, the second number being equal to the first number, each buffer unit receiving the destination information for all of the cells received by the input arrangement, each buffer unit having n sub-buffer units, wherein each sub-buffer unit includes a buffer memory unit for selectively storing groups of cell information and outputting the stored groups to the output arrangement for emission by one of the output ports, and wherein the output arrangement includes n output units, each output unit corresponding to one of the output ports and converting a group of cell information received from a sub-buffer unit in each of the buffer units, plus destination information, into a cell emitted by the corresponding output port.

13. The ATM cell exchange system of claim 12, wherein each of the n sub-buffers further comprises:

address filters receiving corresponding sets of groups of cell information, respectively, each of the sets including a given number of groups, the address filters additionally receiving destination-set data corresponding to one of the n output units, wherein each of the address filters includes parallel expansion circuits for parallelly-expanding the groups of cell information corresponding to one of the sets, a multiplexer for multiplexing the parallelly-expanded groups of cell information, and a write controller which allows a parallelly-expanded and multiplexed group of cell information whose destination information agrees with the destination-set data to be written into the buffer memory unit, and wherein each of the sub-buffers includes a parallel reduction circuit for parallelly-reducing the parallelly-expanded and multiplexed groups of cell information.

14. The ATM cell exchange system of claim 13, wherein the destination-set data received by the address filters of a sub-buffer unit is common destination-set data that is received in common by all of the address filters of that sub-buffer unit.

15. The ATM cell exchange system of claim 13, wherein the input arrangement extracts the destination information of cells received via the n input ports, multiplexes the extracted destination information to produce a multiplexed signal, and outputs the multiplexed signal to all of the buffer units, and wherein the write controller of an address buffer compares the multiplexed signal with the destination-set data.

16. The ATM cell exchange system of claim 12, wherein the input arrangement parallelly-expands the cells received via the n input lines to divide the cells into the groups of cell information.

* * * * *